United States Patent
Simmons

(10) Patent No.: US 6,470,589 B2
(45) Date of Patent: Oct. 29, 2002

(54) PICK-UP POWER RETURN TAPE

(76) Inventor: William G. Simmons, 239 Barnes La., Toms River, NJ (US) 08753

(*) Notice: Subject to any disclaimer, the term of this patent is extended or adjusted under 35 U.S.C. 154(b) by 14 days.

(21) Appl. No.: 09/736,093

(22) Filed: Dec. 14, 2000

(65) Prior Publication Data

US 2002/0073569 A1 Jun. 20, 2002

(51) Int. Cl.[7] ................................................ G01B 3/10
(52) U.S. Cl. ............................................ 33/759; 33/770
(58) Field of Search .......................... 33/758, 755, 771, 33/770, 759, 760, 761, 768, 769

(56) References Cited

U.S. PATENT DOCUMENTS

| | | | | |
|---|---|---|---|---|
| 230,592 A | * | 7/1880 | Williamson | 33/760 |
| 1,085,193 A | * | 1/1914 | Buniff | 33/758 |
| 1,145,244 A | * | 7/1915 | Hoffmann | 33/755 |
| 1,646,826 A | * | 10/1927 | Langsner | 33/758 |
| 2,205,626 A | * | 6/1940 | Mason | 33/755 |
| 3,036,791 A | * | 5/1962 | Siggelkow | 33/758 |
| 3,965,579 A | * | 6/1976 | Woods | 33/758 |
| 4,333,241 A | * | 6/1982 | Wasik et al. | 33/755 |
| 4,920,659 A | * | 5/1990 | Becher | 33/555.4 |
| 4,930,227 A | * | 6/1990 | Ketchpel | 33/758 |
| 5,010,657 A | * | 4/1991 | Knapp | 33/770 |
| 5,367,785 A | * | 11/1994 | Benarroch | 33/770 |
| 5,383,285 A | * | 1/1995 | Takahashi | 33/771 |
| 5,544,420 A | * | 8/1996 | Choi | 33/771 |
| 5,600,894 A | * | 2/1997 | Blackman et al. | 33/758 |
| 5,937,532 A | * | 8/1999 | Eirich et al. | 33/758 |
| 6,073,983 A | * | 6/2000 | Schroeder | 33/760 |
| 6,101,734 A | * | 8/2000 | Ten Caat et al. | 33/770 |
| 6,108,926 A | * | 8/2000 | Fraser et al. | 33/758 |
| 6,237,243 B1 | * | 5/2001 | Cook | 33/758 |
| 6,338,204 B1 | * | 1/2002 | Howle | 33/758 |
| 6,370,790 B1 | * | 4/2002 | Stenger | 33/758 |

FOREIGN PATENT DOCUMENTS

| | | | | |
|---|---|---|---|---|
| CA | 650324 | * | 10/1962 | 33/770 |
| WO | 93018367 A1 | * | 9/1993 | 33/759 |

OTHER PUBLICATIONS

Sternat, "The Other End," The Real Estate Appraiser & Analyst, Fall 1989, p. 77.*

* cited by examiner

*Primary Examiner*—Diego Gutierrez
*Assistant Examiner*—Stanley J. Pruchnic, Jr.
(74) *Attorney, Agent, or Firm*—Charles I. Brodsky

(57) ABSTRACT

A power return tape in the form of a measuring tape including a case, a blade wound within the case graduated in marked increments, an exposed end hook at one end of the blade for unwinding the blade and drawing it from the case, and with at least one of the exposed hook and a length of the blade adjacent thereto cooperating to form a grasping tool for falling objects, in a manner separate and apart from the employment of the marked increments on the tape in making linear measurements—and particularly attractive for mechanics working from ladders and/or at other heights.

15 Claims, 3 Drawing Sheets

PICK-UP POWER RETURN TAPE

FIELD OF THE INVENTION

This invention relates to power return tape measures, in general, and to such tape measures as are especially suited for use by a vinyl siding mechanic, in particular.

BACKGROUND OF THE INVENTION

Power return tape measures are known in the art. Whether they be ¼", ½", ¾" or 1" wide, such measures employ blades graduated in 1/16" increments with end hooks oftentimes re-inforced. Typically constructed of tempered high carbon steel, the blades oftentimes employ additional load bearing rivets at the end hook to reduce blade edge breakage, and are usually housed with an impact resistant case, frequently with a belt clip on its back side. As will be readily appreciated, power return tapes of this type find favor in the carpentry field and in the vinyl siding industry.

As will also be appreciated, vinyl siding mechanics of ten times find themselves working on ladders—frequently for extended periods of time. Under such conditions, it is not unusual for the mechanic to drop the piece of siding he is working with, or the hammer he is using, or the nails he is hammering. On such occasions, the typical routine is for the worker to stop what he or she is then doing, climb down the ladder, retrieve what has fallen, and climb back up to continue working again. Moreover,experience has shown that this routine takes place about once every 45–60 minutes. When working at a height which can well be 20–25 feet, this repeated process of climbing down, retrieving, and climbing back up again can be quite arduous especially where the mechanic is either working alone, or where an assistant is away working at a different location at the property.

SUMMARY OF THE INVENTION

As will become clear from the following description, a power return tape according to the invention is in the form of a measuring tape having a case, a blade wound within the case and graduated in marked increments, and an exposed hook at one end of the blade for unwinding the blade and drawing it out from the case. In accordance with the invention, at least one of the exposed hook and a length of blade adjacent to the hook cooperate in forming a grasping tool for fallen objects, separate and apart from employing the marked increments of the blade in linear measurement. In such respect, the measuring tape proves particularly attractive for mechanics working at the top of ladders, and/or at other heights from which such objects may accidentally drop.

In accordance with a preferred embodiment of the invention, the cooperation which exists between the exposed hook and the length of blade so drawn enable the grasping of these fallen objects independently of the length of the blade which has been drawn from the case. In one configuration, the blade itself may be of a metallic fabrication, so as to be able to twist and bend to a prescribed shape in, for example, grasping a hammer which has fallen or a piece of vinyl siding, in being retrieved. In another configuration, the blade can be provided with one or more of a series of slots, in arranging for the exposed hook to loop around the blade to be received and held when fitted therethrough to allow grasping from the elevated height, as when the hook is looped under the blade. Where lighter items are required to be retrieved—as a nail—the exposed hook can be magnetized, in accordance with the invention, and may be configured substantially orthogonal, from top to bottom. Where the fallen object is of a type having an opening to be fitted into when grasped, the exposed hook, on the other hand, may be one which tapers inwardly from top to bottom, whether or not it is magnetized. In certain instances, and in accordance with the invention, the exposed hook, itself, could be arranged to swivel at its join with the blade end, in allowing for the establishment of a further slot opening of variable thickness in grabbing onto that which is then laying on the ground, for lifting back to the mechanic.

In another instance of the invention, for grasping a larger tool such as a hammer—instead of a smaller item (as a plumbing fitting) which can be raised through magnetic attraction—a further embodiment of the invention employs a sheath at a bottom of the case through which the blade passes when drawn. The sheath is there extendable and pliant to retain the prescribed shaped to which the sheath is twisted and bent in forming the grasping end to hold onto the dropped item. In such construction, a tab may additionally be included, coupled to the sheath, as an aid in drawing the sheath out from the bottom of the case.

Alternatively, to raise a fallen large object as a screwdriver, pliers, or other tool, an adhesive strip may be included at an underside of the case having a like tab portion through which the blade passes when drawn by the exposed hook. With the adhesive strip being extendable via the tab, and with the strip being peelable forwardly of, and around, the end hook for securement at a top surface of the blade, the object can be retrieved. In this respect, a further feature of the invention envisions a plurality of these adhesive strips, one below the other, each of which is individually peelable forwardly and around the exposed hook for grabbing onto the fallen object, with each adhesive strip being discardable afterwards on an individual use basis. In accordance with the invention, the length of blade adjacent to the hook may be of whatever length is required in effecting the "picking-up" action, and when a sheath or adhesive is employed in so doing, such appurtenances may be of the order of 2–5" in length.

Thus, and as will be seen more particularly from the following description, the power return tape of the invention serves a purpose other than just one of linear measurement—namely, one which allows for retrieval of fallen objects without the need for a mechanic working at a height to continually climb down from that height, or from the ladder then being used, only to retrieve the item and then climb back up to continue performing anew. With the pick-up measuring tape of the invention, therefore, a significant amount of time and energy is substantially saved, along with the inconvenience otherwise associated with it.

BRIEF DESCRIPTION OF THE INVENTION

These and other features of the present invention will be more clearly understood from a consideration of the following description, taken in connection with the accompanying drawings, in which.

DETAILED DESCRIPTION OF THE INVENTION

Figure 1:
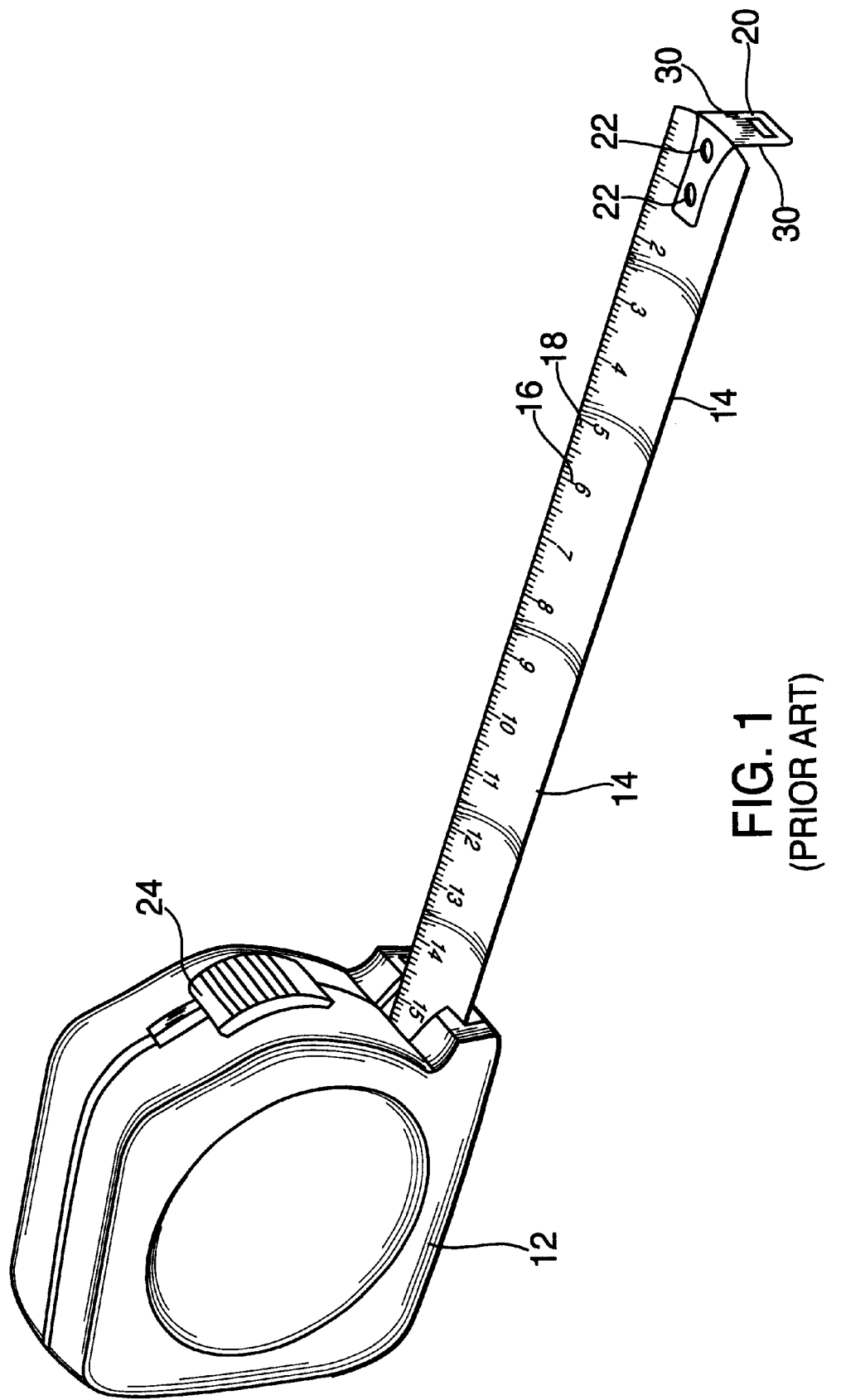
FIG. 1 is a perspective view of a power return measuring tape known in the prior art.
Figure 2:
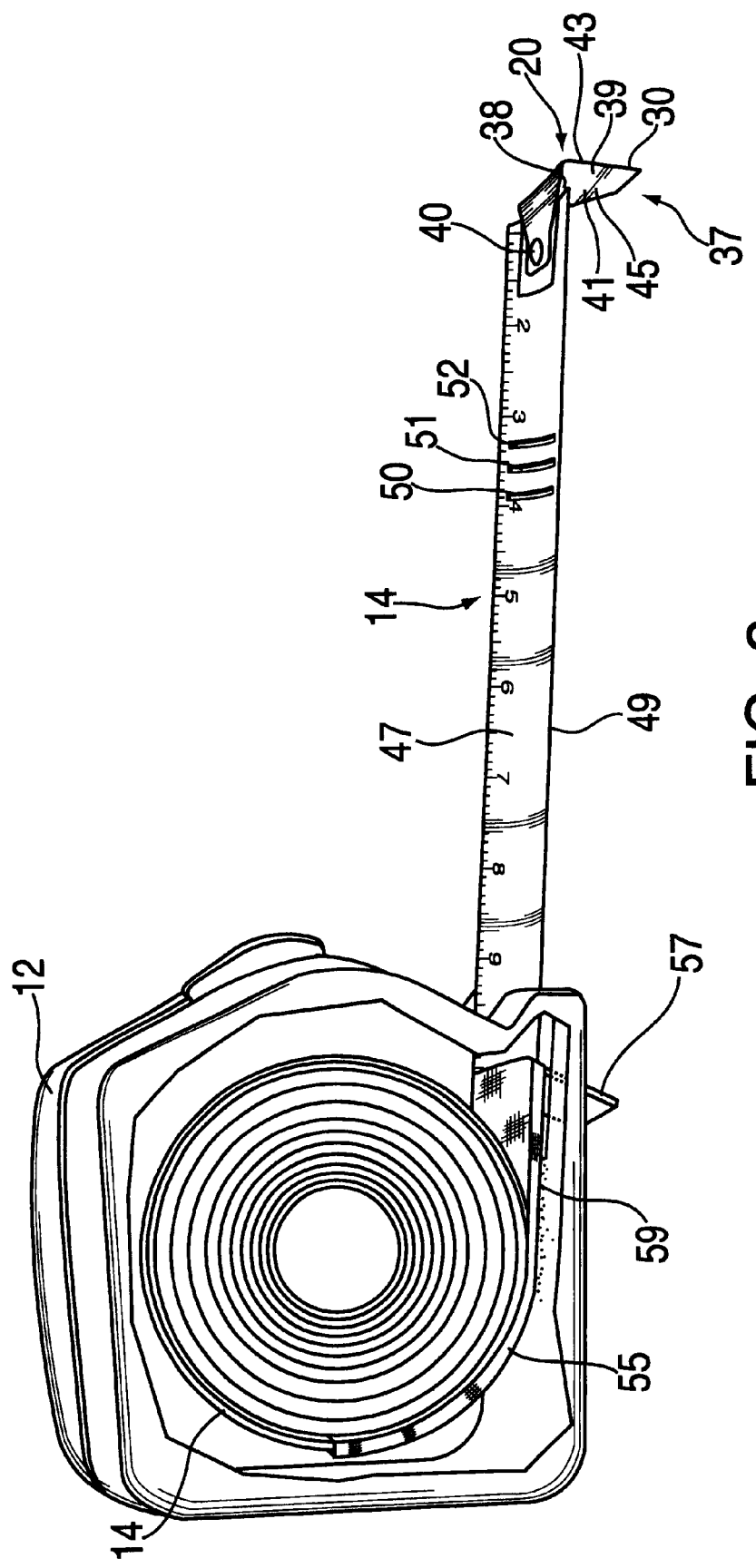
FIG. 2 is a perspective view of such a measuring tape embodying the present invention in its employment of the blade-surrounding sheath, along with other alternative arrangements of the invention.
Figure 3:
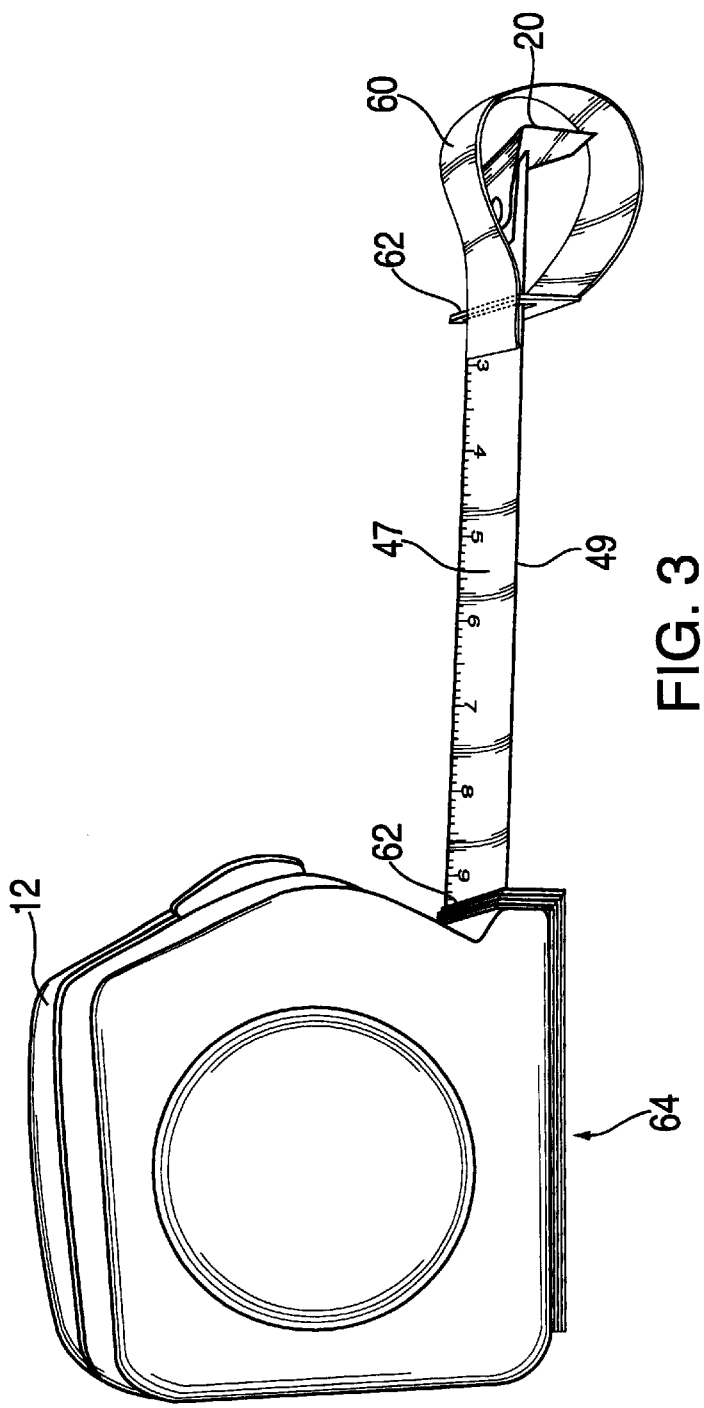
FIG. 3 is a perspective view of a power return measuring tape helpful in the understanding of a construction of the invention employing the adhesive strip feature.

In the perspective views of FIGS. 2 and 3, the power return measuring tape of the invention includes a case 12, a blade 14 wound within the case 12, graduated in marked increments 16, 18, typically 1/16" apart in well known manner. An exposed hook 20 is secured to the end of the blade 14 by load bearing rivets 22 to reduce blade edge breakage. A positive locking slide mechanism is shown at 24 once the blade 14 is drawn out from the case 12. In accordance with the invention, the blade 14 is of a metallic fabrication—preferably tempered high carbon steel—while the case 12 may be constructed to be impact resistant, as with a chrome plate, and with a handy belt clip, for example, on its back side (not shown). Such power return measuring tape may be of 1/2", 3/4", or 1" width, and of blade lengths of 12–30 ft. in length, or longer. As with these power return tapes known to the prior art and as shown in FIG. 1, the blade 14 may be chemically treated so as to be resistant to abrasion and pitting, and to be significantly unaffected by moisture, acid or caustic solution. As will be appreciated, the blade 14 may be "colored" for high visibility, and may be concave shape to allow for extension without buckling.

In accordance with one aspect of the invention, at least one of the exposed hook 20 and a length of the blade 14 adjacent to the hook 20 are further arranged to form a grasping tool of fallen objects separate and apart from the employment of the return tape and its increments 16, 18 in linear measuring. Thus, besides the blade 14 being of metallic fabrication, it is selected of a fabrication pliant to twisting and bending to a prescribed shape—so as to allow a mechanic to configure the blade in a manner to utilize it in whatever shape is needed to retrieve a fallen object, independent of the length of blade drawn out from the case 12 by the hook 20. In this respect, the exposed hook 20 can also be magnetized to assist in picking up nails and other light metallic objects from an extended height.

Figure 5:
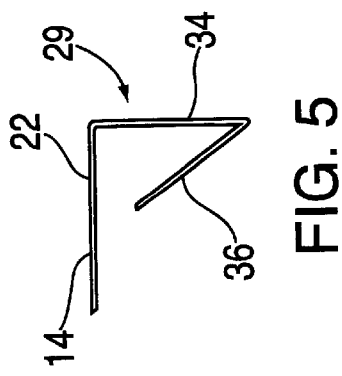
FIGS. 4–5 are helpful in an understanding of other embodiments of the present invention in forming a grasping tool of the tape separate and apart from its employment in making linear measurements.
Figure 4:
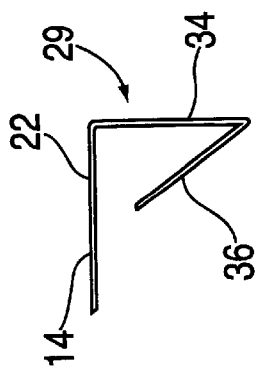

Illustrated in FIG. 2 as having sides 30, substantially orthogonal from top to bottom, the hook 20 may alternatively be constructed with sides 32 which taper inwardly from top to bottom—to assist in fitting within slots or other openings of fallen objects to be retrieved (FIG. 4). Similarly, and as shown in FIG. 5), the orthogonally sided hook 20 of FIGS. 2 and 3 could be replaced, instead, by a hook 29 which includes a first downwardly extending portion 34 and a second angled portion 36 which extends upwardly in essentially serving as a claw to grasp the fallen object. On the other hand—and in accordance with the embodiment of the invention shown in FIG. 2—the exposed hook 20 may be swivelably joined at the end of a blade whose lower end 37 slopes away in forming a slot 38 of a thickness variable in accordance with a swivel of the downwardly extending portion 39 about a pivot point 40. The fallen object could thus be aligned to fit within the slot 38 for purposes of being grasped and retrieved, and once recovered by the mechanic, the hook 20 is returned to its initial position for measurements once again against the bearing surface 41 of the downward portion 39.

Other configurations can similarly be substituted while continuing to employ the end hook 20 along with a length of the blade adjacent to it in forming a grasping tool. Thus, a double sided adhesive could be affixed either at the forward end 43 of the hook 20 of FIG. 2, or to its opposing surface 45, or to either the top side or underside of the tape 14—as at 47 or 49, respectively.

The arrangements of FIGS. 2 and 3 illustrate another possible embodiment according to the invention, in which a plurality of slots 50, 51, 52 . . . are formed within the surface of the blade 14 into which the end hook 20 is arranged to fit—and received and held in place by one such slot once the hook is looped around the blade 14 after it is drawn from the case 12. In the configuration of FIG. 3, the hook 20 could be looped under the blade 14 to the slot 50 in forming the grasping tool for a hammer separate and apart from the employment of the power return tape as a measuring tool and independent of the length of blade drawn out from the case. By fabricating the blade 14 to be pliant so as to sustain the twist and bend to the prescribed shape for facilitating the fallen object to be picked up, this feature of the invention will be more readily understood.

In the arrangement of FIG. 2 for forming this grasping tool for a larger object, the power-return measuring tape of the invention may alternatively include a sheath 55 secured at a bottom of the case 12 and through which the blade 14 passes when drawn out, with the sheath being extendable by a tab 57 coupled to it at its end. Such sheath 55 may be adhesively secured with the case 12 (as at 59), and of a length of some 2"–5" fabricated of a "shape retentive" material once twisted and bent to that configuration that would best enable the mechanic on a ladder or other height to load the sheath adjacent the end hook 20—and then extend the end hook 20 to draw out the blade 14 the needed length to reach the object on the ground. Once the object is grasped and held by the looped configuration of the sheath 55, the slide mechanism 24 is actuated to return the blade into the case 12 in retrieving the hammer, plier, etc.—at which time the mechanic simply unravels the loop so formed and returns the sheath to its original position.

In the configuration of FIG. 3, on the other hand, an adhesive strip 60 may be secured at an underside of the case 12, with its own tab extension 62 through which the blade passes when drawn, and with the adhesive strip 60 being extendable towards the end hook 20 in likewise forming the shape best suited for object retrieval. Such adhesive strip 60 may be of double-sided tape, and peelable forwardly around the end hook 20 for securement at a top surface of the blade 14, as shown at the right side of FIG. 3. In such configuration, furthermore, a plurality of such adhesive strips may be stacked as at 64, one atop the other (as at the left side of FIG. 3), and individually peelable in separation, to be looped around the end hook 20, over and about the fallen object to be grasped and retrieved. After so doing, as will be appreciated, that adhesive strip, of double-sided tape configuration used, could then be discarded in awaiting an occasion to employ the next one in the stack.

While there have been described what are considered to be preferred embodiments of the present invention, it will be readily appreciated by those skilled in the art that modifications can be made without departing from the scope of the teachings herein of using a power return measuring tape to do more than just serve for purposes of linear measurement, but to incorporate either or both of its end hook and blade for purposes of lifting and retrieval. While useful in the construction field for different types of mechanics, such power return tape will be understood to be particularly useful for vinyl contractors whose type of operation oftentimes results in items being dropped. With the power return tape of the invention serving as a "pick-up" device in addition, such problem is easily overcome—and for such reason, therefore, resort should be had to the claims appended hereto for a true understanding of the scope of the invention.

I claim:

1. A measuring tape and grasping tool combination for grasping fallen objects comprising:
   a case;
   a blade wound within said case and graduated in marked increments, said blade including a plurality of slots along a length of said blade;
   an exposed hook at one end of said blade for unwinding said blade and drawing a length of said blade out from said case; and
   a means for grasping objects, wherein said means for grasping objects includes
   a selected one of said slots being adapted for receiving and holding said exposed hook and
   said one end being looped about said blade, drawn in fitting therewith, independent of the length of blade drawn out from said case by said hook.

2. The combination of claim 1 wherein said blade is of a metallic fabrication.

3. The combination of claim 2 wherein said metallic blade is of a fabrication pliant to twisting and bending to a prescribed shape.

4. The combination of claim 1 wherein said exposed hook is swivelably joined at said blade end in allowing for establishment of a slot therebetween of variable thickness.

5. The combination of claim 1 wherein said exposed hook is magnetized.

6. The combination of claim 1 wherein said exposed hook includes a first downwardly extending portion and a second angled portion extending upwardly therefrom.

7. The combination of claim 1 wherein said exposed hook is substantially orthogonal from top to bottom.

8. The combination of claim 1 wherein said exposed hook tapers inwardly from top to bottom.

9. The combination of claim 1 wherein said means for grasping objects further includes said one end being looped under said blade.

10. The combination of claim 1, also including a sheath at a bottom of said case through which said blade passes when drawn, with said sheath being extendable and pliant to retain a prescribed shape to which said sheath is twisted and bent.

11. The combination of claim 10, additionally including a tab coupled to said sheath for drawing said sheath out from said bottom of said case.

12. The combination of claim 10, including means to adhesively secure said sheath to said bottom of said case.

13. The combination of claim 10 wherein said sheath is of the order of 2–5" in length.

14. The combination of claim 1, also including an adhesive strip at an underside of said case having a tab extension through which said blade passes when drawn, with said adhesive strip being extendable by said tab from said underside of said case, and with said strip being peelable forwardly of, and around, said exposed hook for securement at a top surface of said blade.

15. The combination of claim 14, including a plurality of said adhesive strips, each of which is individually peelable forwardly and around said exposed hook in use, and discardable thereafter.

* * * * *